No. 851,061. PATENTED APR. 23, 1907.
H. BROOME.
CORN HARVESTER.
APPLICATION FILED MAY 14, 1906.
2 SHEETS—SHEET 1.
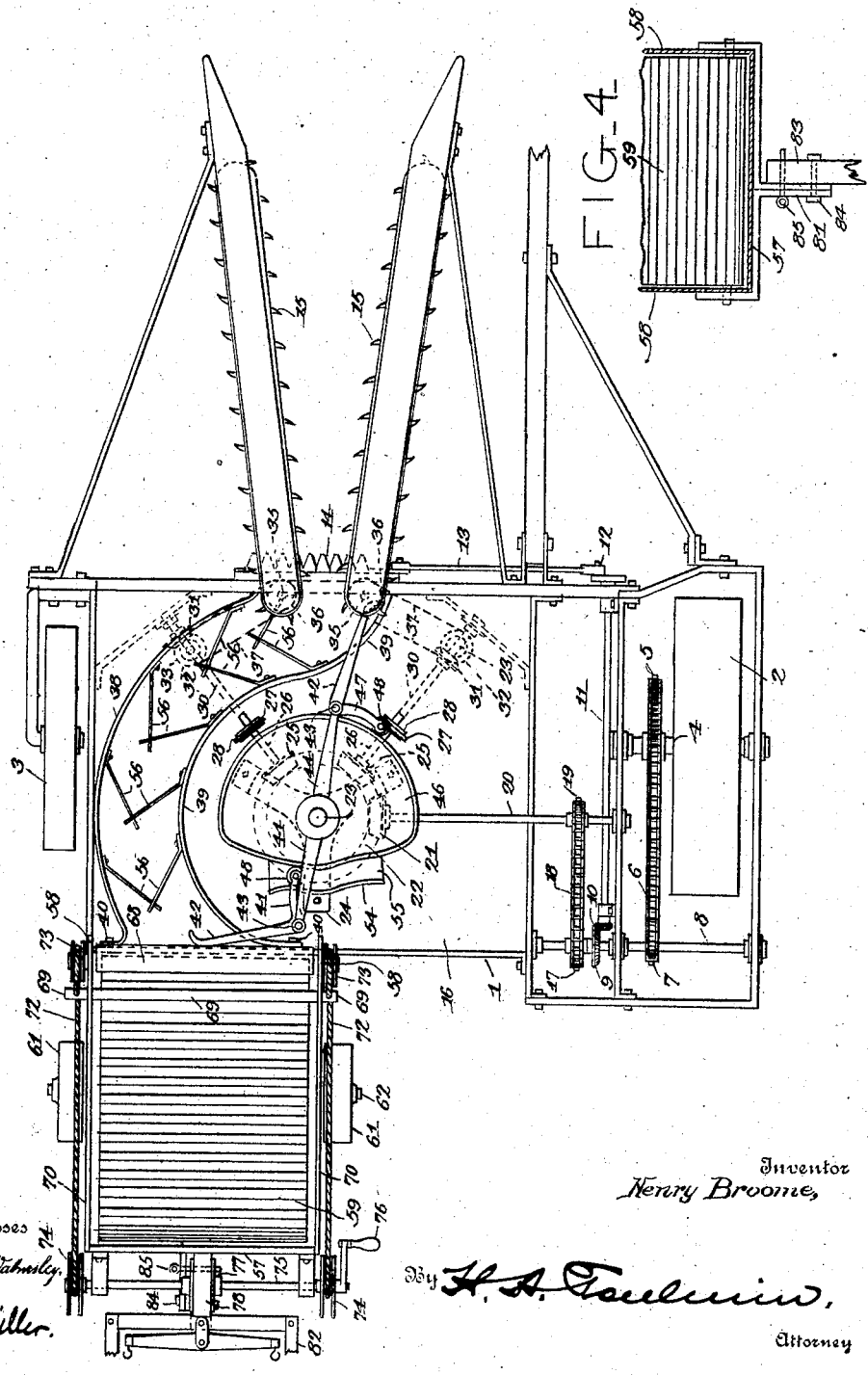

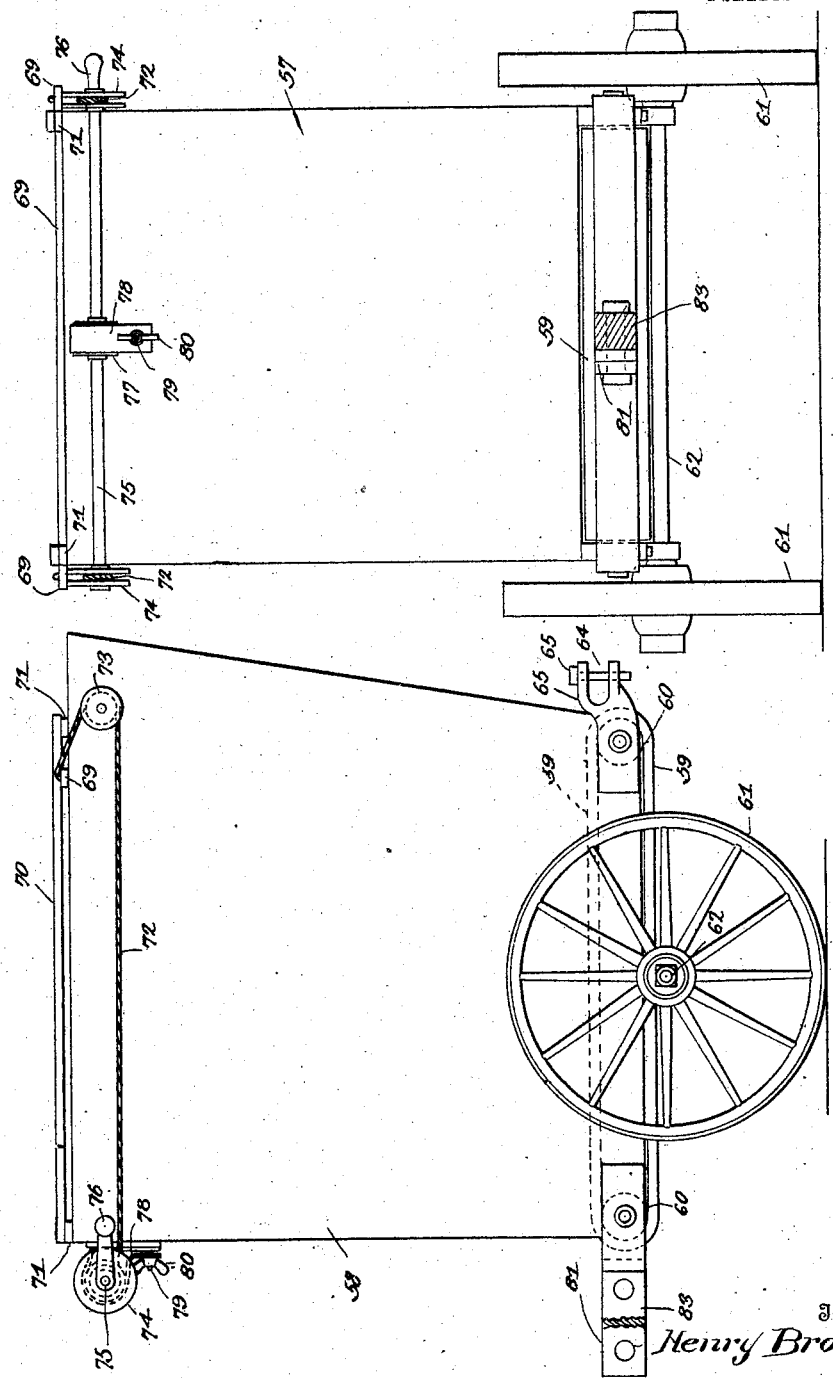

UNITED STATES PATENT OFFICE.

HENRY BROOME, OF SPRINGFIELD, OHIO, ASSIGNOR OF ONE-THIRD TO WILLIAM DENNICK, OF DAYTON, OHIO, AND ONE-THIRD TO CLAUDE W. FLICK, OF SPRINGFIELD, OHIO.

CORN-HARVESTER.

No. 851,061.      Specification of Letters Patent.      Patented April 23, 1907.

Application filed May 14, 1906. Serial No. 316,644.

*To all whom it may concern:*

Be it known that I, HENRY BROOME, a citizen of the United States, residing at Springfield, in the county of Clark and State of Ohio, have invented certain new and useful Improvements in Corn-Harvesters, of which the following is a specification, reference being had therein to the accompanying drawings.

This invention relates to corn-harvesters, and has for its object to provide an implement of this class by means of which the standing stalks of corn may be cut and formed into a shock and the shock deposited at any suitable point near to or remote from the place where the machine is working.

To these ends the invention consists in certain novel features which I will now proceed to describe and will then particularly point out in the claims.

In the accompanying drawings, Figure 1 is a plan view of a machine embodying my invention in one form. Fig. 2 is a side elevation of the tender detached. Fig. 3 is a rear elevation of the same, and Fig. 4 is a detail plan section of the rear end of the tender, illustrating the hitch.

In the said drawings, I have illustrated a machine embodying my invention in one form, the same comprising a main portion or machine proper by means of which the stalks are cut and carried to the rear and one or more tenders or wheel-supported shocking-receptacles, one of which is detachably coupled to the rear of the main machine, receive the stalks, which are fed into the same by the main machine to form the shock, said tender being uncoupled or disconnected from the main machine after the shock is formed and employed to carry the shock to and deliver it at any desired point.

Referring to said drawings, 1 indicates as a whole the frame of the main machine, the same being supported on ground-wheels 2 and 3, of which the former is the driving-wheel from which the various mechanisms of the harvester derive their motion. In the present instance the axle 4 of the driving-wheel 2 is shown as provided with a sprocket-wheel 5, around which passes a sprocket-chain 6, said chain also passing around a sprocket-wheel 7 on the main drive-shaft 8, mounted in the frame 1. A bevel-gear 9 on the drive-shaft 8 meshes with a bevel-pinion 10 on a longitudinal shaft 11, provided at its front end with a crank-wheel 12. Said crank-wheel is connected by a pitman 13 with a reciprocating cutter-bar 14 at the front of the frame 1, by means of which cutter-bar the standing stalks are severed.

Gathering-conveyers 15 converge rearwardly toward the cutter-bars and extend somewhat beyond them rearwardly over the deck 16 of the machine. This cutting and gathering mechanism may be of any approved construction, that shown being well known and requiring no detailed description.

The gathering-conveyers may be driven in any suitable manner. The mechanism for this purpose shown will be briefly described. The drive-shaft 8 has mounted thereon a sprocket-wheel 17, which through a sprocket-chain 18 drives a sprocket-wheel 19, secured on a shaft 20, extending transversely of the machine. The shaft 20 is provided with a bevel-gear 21, which meshes with a bevel-gear 22, secured on the lower end of the reel-shaft 23, said reel-shaft being mounted in a bearing-bracket 24, mounted on the deck 16. The bevel-gear 22 meshes with bevel-gears 25 on shafts 26, located above the platform 16 and provided at their forward ends with sprocket-wheels 27, which by sprocket-chains 28 drive sprocket-wheels 29 on shafts 30, located below the deck 16. These shafts 30 carry bevel-gears 31 at their forward ends, which mesh with bevel-gears 32 on downwardly-extending shafts 33, which are secured at their upper ends to the deck 16 of the main frame and carry sprocket-wheels 34. The rear shafts 35 of the gathering-conveyers are provided at their lower ends with sprocket-wheels 36, and sprocket-chains 37 pass around the sprocket-wheels 34 and 36 and thereby drive the conveyers.

Mechanism is provided for conveying in an upright position the severed stalks thus delivered by the gathering-conveyers at the front of the machine, said conveying mechanism carrying the stalks to the rear of the machine and there delivering them to the tender or shocking-receptacle. The conveying mechanism comprises two curved upright guides 38 and 39, arising from the platform 16, their front ends extending forward to and embracing the rear ends of the gathering-conveyers 15. These guides are suitably supported at their front and rear ends, and the inner guide 39 is slotted horizontally, as indicated at 41, to permit the passage of the reel-arms.

The reel-arms may be of any suitable construction; but I prefer that shown in the drawings, in which I provide the vertical reel-shaft 23 with a series of arms 44, which carry a rock-shaft 43, on which are secured reel-arms 42, adapted to extend through the openings or slots in the guide members and engage the stalks of corn between said guides. The lower end of the rock-shaft is provided with an arm carrying a roller which engages the surface of a fixed cam and guides the reel-arms to convey the stalks through the guideway and withdraw the arms therefrom at the rear end of the passage without interfering with the movement of the stalks immediately following.

In connection with the main machine which gathers, severs, and feeds rearward the stalks in the manner just described I employ a tender or shocking-receptacle which is so connected to the main machine as to have its receiving end located immediately at the rear or discharge end of the chute or guideway between the guides 38 and 39. This tender or receptacle is open at one end, the same being the forward end when the tender is coupled to the main machine, and is closed at the other end by means of a wall or end piece 57, the sides also being closed by side walls or side pieces 58. The bottom may be of any suitable construction, and I have shown the tender as provided with a movable bottom, the same consisting of an endless band 59, of any suitable material, passing around supporting-rollers 60 at the front and rear ends of the bottom. The tender is provided with supporting-wheels 61, mounted on opposite ends of a transverse axle 62, upon which the receptacle is adapted to tilt in the manner hereinafter set forth. In order to detachably couple the tender to the main machine, the former is provided at its forward end with a coupling member or members 63 in the form of a casting having an open-mouth slot 64, across which extends a removable coupling-pin 65. The rear transverse member of the frame 1 has coöperating coupling members 66 in the form of brackets, carrying transverse pins 67, adapted to fit the slots 64 and to be held therein by the pins 65. The axes of the couplings lie in the same plane with the top of the deck 16 of the main machine and the bottom 59 of the tender or shocking-receptacle, so as to maintain these two at the same height at their meeting. A guard 68, secured to the rear edge of the platform 16, extends over the bottom of the tender in order to prevent a gap at this point.

In order to maintain the stalks in upright position after they have been delivered from the main machine into the tender or shocking-receptacle, I provide an abutment-bar 69, which extends transversely across the top of the receptacle and is supported so as to slide from front to rear thereof. To this end guide bars 70 are supported above the top of the sides 58 by means of blocks 71 or otherwise, and the bar 69 has its end portions guided between said guide-bars and the tops of the sides 58 in an obvious manner. When the stalks are first fed into the receptacle, the bar 69 is in its forward position, or nearest what is then the front end of the tender—to wit, the open end. As the stalks are pressed into the receptacle by the reel-arms the cross-bar 69 supports their upper ends and prevents them from toppling over into the receptacle, and as the stalks accumulate the cross-bar gradually yields and recedes, moving toward the other or closed end of the receptacle. In order to provide for a sufficient resistance on the part of this cross-bar to the pressure of the stalks, I employ the mechanism illustrated.

To each end of the cross-bar 69 there is connected one end of a rope, cord, or other flexible connection 72, which passes around an idle pulley 73 near the open end of the receptacle and thence to and around a winding-drum 74, to which its other end is connected. The winding-drums 74 are mounted on a shaft 75, supported on the closed end 57 of the receptacle and provided with a crank-arm 76, by means of which it may be rotated. This shaft is provided with any suitable braking mechanism—such, for instance, as the brake-wheel, or friction-wheel 77, shown secured on the central portion thereof, around which passes a brake-band 78, the ends of which are secured to the end 57 of the receptacle by means of a screw-bolt 79 and thumb-nut 80. This mechanism also serves to aid in the discharge of the shock from the tender in the manner hereinafter described.

The closed end of the tender is provided with means for hitching thereto a draft-animal, the construction preferred for that purpose being the one shown, in which a projection or tongue 81 extends rearward from the tender and has connected to it a pair of shafts or thills 82, these latter having a rearward projection 83, which extends alongside of the projection 81 and is connected thereto by a horizontal pivot-bolt 84. A removable pin 85 also passes through the projections 81 and 83 and serves when in place to make the connection between the thills and tender a rigid one. By withdrawing the pin 85 the connection becomes a pivotal one, permitting the tender or receptacle to tilt upon its axle.

The machine thus organized preferably comprises a plurality of tenders, although it may be used with a single tender. When the machine is in operation, the tender is hitched to the rear of the main machine in the manner illustrated in Fig. 1 of the drawings, and as the machine advances the stalks are cut and carried in an upright position across the platform of the machine, being delivered at the rear into the shocking-receptacle of the tender against the cross-bar 69 with the butt supported on the movable base 59. As the stalks accumulate in the receptacle the said cross-bar yields rearward, holding the stalks upright, but allowing them to move toward the rear as the bottom 59 turns around the supporting-rollers, and this continues until the receptacle is filled or until a sufficient number of stalks has accumulated therein to make a shock of the desired size. This shock may be then or thereafter bound in any suitable manner. Thereupon a draft-animal is hitched to the tender by means of the provision made therefor at the closed end thereof, the coupling between the thills and tender being made rigid by the insertion of the pin 85, so as to prevent premature tilting of the receptacle. The tender is then uncoupled from the main machine by withdrawing the pins 65, and the tender may then be used as a means for transporting the shock to any desired point, such as the side of the field or a barn or other suitable shelter. When the desired point is reached, the pin 85 is withdrawn, permitting the receptacle to tilt with its open end downward, the movable bottom 59 facilitating the discharge of the shock, which may be further aided by rotating the shaft 75 in a direction such as to draw the cross-bar 69 toward the open end of the receptacle, thus forcing the top of the shock outward before it. By this means the shock is deposited in an upright position at the point of discharge with the stalks resting firmly upon their butt-ends. The tender may be readily withdrawn from under the shock in case the latter is not entirely discharged therefrom and the coupling between the tender and its hitch again made rigid by the insertion of the pin 85, whereupon the tender may be driven back to the main machine. I prefer to employ a plurality of these tenders, for the reason that through their means the cutting of the corn by the mian machine may be made practically continuous, an empty tender being coupled to the main machine as soon as a full one has been disconnected therefrom and driven off.

I wish it to be understood that I do not desire to be limited to the exact details of construction shown and described, for obvious modifications will occur to a person skilled in the art.

Having thus fully described my invention, what I claim as new, and desire to secure by Letters Patent, is—

1. An attachment for corn-harvesters consisting of a wheel-supported tender, means for separably connecting the same to a harvester at the rear of said harvester, said tender comprising a shocking-receptacle open at one end to receive the stalks and having a draft-hitch at its other end, substantially as described.

2. An attachment for corn-harvesters consisting of a wheel-supported tender, means for separably connecting the same to a harvester at the rear of said harvester, said tender comprising a shocking-receptacle open at one end to receive the stalks, a draft-hitch at the other end thereof, and means for discharging the shock from said receptacle when disconnected from the harvester, substantially as described.

3. An attachment for corn-harvesters consisting of a wheel-supported tender, means for separably connecting the same to a harvester at the rear of said harvester, said tender comprising a shocking-receptacle open at one end to receive the stalks, a draft-hitch at the other end thereof, and means for tilting said receptacle to discharge the shock when disconnected from the harvester, substantially as described.

4. An attachment for corn-harvesters consisting of a wheel-supported tender, means for separably connecting the same to a harvester at the rear of said harvester, said tender comprising a shocking-receptacle open at one end to receive the stalks, a draft-hitch at the other end thereof, and a cross-bar mounted to slide on said receptacle, substantially as described.

5. An attachment for corn-harvesters consisting of a wheel-supported tender, means for separably connecting the same to a harvester at the rear of said harvester, said tender comprising a shocking-receptacle open at one end to receive the stalks, a draft-hitch at the other end thereof, a cross-bar mounted to slide in said receptacle, means for positively moving said cross-bar toward the open end of said receptacle, substantially as described.

6. An attachment for corn-harvesters consisting of a wheel-supported tender, means for separably connecting the same to a harvester at the rear of said harvester, said tender comprising a shocking-receptacle open at one end to receive the stalks, a draft-hitch at the other end thereof, a cross-bar mounted to slide on said receptacle, means for positively moving said cross-bar toward the open end of said receptacle, and a brake for causing said cross-bar to offer resistance to the pressure of the incoming stalks, substantially as described.

7. An attachment for corn-harvesters consisting of a wheel-supported tender, means for separably connecting the same to a harvester at the rear of said harvester, said tender comprising a shocking-receptacle open at one end to receive the stalks, a draft-hitch at the other end thereof, a cross-bar mounted to slide on said receptacle, and a brake for causing said cross-bar to offer resistance to the pressure of the incoming stalks, substantially as described.

8. An attachment for corn-harvesters consisting of a wheel-supported tender, means for separably connecting the same to a harvester at the rear of said harvester, said tender comprising a shocking-receptacle open at one end to receive the stalks, a draft-hitch at the other end thereof, a cross-bar mounted to slide on said receptacle, a brake for causing said cross-bar to offer resistance to the pressure of the incoming stalks, and means for causing said receptacle to tilt to discharge the shock when disconnected from the harvester, substantially as described.

9. An attachment for corn-harvesters consisting of a wheel-supported tender, means for separably connecting the same to a harvester at the rear of said harvester, said tender comprising a shocking-receptacle open at one end to receive the stalks, a draft-hitch at the other end thereof, a cross-bar mounted to slide in said receptacle, means for positively moving said cross-bar toward the open end of said receptacle, a brake for causing said cross-bar to offer resistance to the pressure of the incoming stalks, and means for discharging the shock from said receptacle, substantially as described.

10. An attachment for corn-harvesters consisting of a tender, means for separably coupling the same to a harvester at the rear of said harvester, said tender comprising a shocking-receptacle mounted on two wheels and open at one end to receive the stalks, a draft-hitch at the other end thereof, said draft-hitch comprising a pivotal connection, and means for locking the same to render it rigid, whereby said receptacle may be tilted to discharge the shock when the pivotal connection is unlocked, substantially as described.

11. An attachment for corn-harvesters consisting of a wheel-supported tender, means for detachably coupling the same to a harvester at the rear of said harvester, said tender being open at one end to receive the stalks, a draft-hitch at the other end thereof, and a movable bottom therefor, substantially as described.

12. An attachment for corn-harvesters consisting of a wheel-supported tender, means for detachable coupling the same to a harvester at the rear of said harvester, said tender having one end open to receive the stalks, a draft-hitch at the other end of said tender, and a movable bottom therefor formed by an endless belt or carrier and supporting rollers, substantially as described.

13. An attachment for corn-harvesters consisting of a wheel-supported tender, means for detachably coupling the same to a harvester at the rear of said harvester, said tender being open at one end to receive the stalks, a draft-hitch at the other end of said tender, a movable bottom therefor formed by an endless belt or carrier and supporting rollers, and means for tilting said tender to discharge the shock therefrom, substantially as described.

14. An attachment for corn-harvesters consisting of a tender, means for separately coupling the same to the harvester and comprising a receptacle open at one end, a crank-shaft mounted on the other end of said receptacle, a winding-drum on said crank-shaft, a friction-brake for said drum, a cross-bar mounted to slide on the receptacle, idle pulleys at one end of the receptacle, and flexible connections secured to the edge of the cross-bar and passing around the idle pulleys and winding upon the drum, substantially as described.

In testimony whereof I affix my signature in presence of two witnesses.

HENRY BROOME.

Witnesses:
  IRVINE MILLER,
  E. O. HAGAN.